United States Patent [19]
Thill

[11] 3,855,217
[45] Dec. 17, 1974

[54] IMPROVED PROCESS FOR PREPARING N-BENZYLICALLY SUBSTITUTED AZIRIDINES

[75] Inventor: Bruce P. Thill, Midland, Mich.

[73] Assignee: The Dow Chemical Company, Midland, Mich.

[22] Filed: Apr. 24, 1972

[21] Appl. No.: 246,873

[52] U.S. Cl............................................ 260/239 E
[51] Int. Cl............................................ C07d 23/06
[58] Field of Search ................................ 260/239 E

[56] References Cited
UNITED STATES PATENTS

| | | | |
|---|---|---|---|
| 2,368,082 | 1/1945 | Ulrich .............................. | 260/239 E |
| 3,197,463 | 7/1965 | Tesoro et al. ................... | 260/239 E |
| 3,231,563 | 1/1966 | Dishburger...................... | 260/239 E |

OTHER PUBLICATIONS
Houben–Weyl, Methoden Der Organischen Chemie, Vol. 11/2, (Stuttgart, 1958), page 242, QD258H7.

Dermer et al., Ethylenimine and Other Aziridines, (Academic Press, New York, 1969), pages 121–125, TP248H9D4.

*Primary Examiner*—Alton D. Rollins
*Attorney, Agent, or Firm*—L. Wayne White; David H. Fifield

[57] ABSTRACT

N-Benzylically substituted aziridines are conventionally prepared by reacting a benzyl halide with aziridine (or other non-N-substituted aziridine) in the presence of an acid acceptor. Product yields are considerably improved by conducting the above process in a liquid aromatic hydrocarbon reaction medium. E.g., N-benzylaziridine is prepared in excellent yields by reacting benzyl chloride with aziridine in the presence of powdered KOH and benzene.

10 Claims, No Drawings

IMPROVED PROCESS FOR PREPARING N-BENZYLICALLY SUBSTITUTED AZIRIDINES

BACKGROUND OF THE INVENTION

N-Benzylically substituted aziridines form a known class of compounds. See, for example, Bottini et al. (J. Am. Chem. Soc., 80, 5208), Tesoro et al. (U.S. Pat. No. 3,197,463) and the book "Ethylenimine and Other Aziridines" by O. C. Dermer and G. E. Ham, Academic Press, N.Y. (1969), pages 125–26.

Tesoro et al. (U.S. Pat. No. 3,197,463) described one process for preparing N-benzylically substituted aziridines. The process comprises reacting (a) a benzyl halide or substituted benzyl halide (chloride, bromide or iodide) with (b) aziridine (i.e. ethylenimine) or other non-N-substituted aziridine in the presence of an acid acceptor. The process is conducted in an organic solvent medium (alcohols or ethers) and/or an excess of aziridinyl reactant. The ratio of reactants in the process is at least one mole of aziridinyl reactant and at least one equivalent of base per mole of benzyl halide. An excess of aziridinyl reactant and base is preferred. The acid acceptor is necessary in the reaction to neutralize the hydrogen halide by-product which causes aziridines to ring-open and thus form polyaziridines. Tesoro et al. indicate that the preferred acid acceptors are inorganic bases which are sparingly soluble in the reaction medium (e.g., alkali metal carbonates, bicarbonates and phosphates).

Dishburger describes a similar process for preparing N-allyl aziridines in U.S. Pat. No. 3,231,563. He reacts (a) an allylic halide with (b) aziridine or other non-N-substituted aziridine in the presence of an acid acceptor (hydroxides, alkoxides, and oxides of alkali or alkaline earth metals, ammonia or various tertiary amines). A critical condition necessary for successful operation of his process is that the reaction be conducted in a polar solvent (e.g., water, alcohols, dimethylformamide, etc.). The acid acceptor is typically soluble in such polar solvents. Dishburger shows in his Examples 1 and 2 that the reaction does not take place in benzene.

The similarity between allylic halides and benzylic halides in many reactions is widely recognized.

SUMMARY OF THE INVENTION

An improvement has now been discovered in the process of preparing N-benzylically substituted aziridines. The improved process comprises reacting by contacting (a) a benzyl halide or substituted benzyl halide (chloride, bromide or iodide) with (b) aziridine or a non-N-substituted aziridine in the presence of (c) an acid acceptor and in a liquid aromatic hydrocarbon solvent medium. The products are thus obtained in excellent yields and purity.

In the instant process, the acid acceptors are virtually insoluble in the liquid aromatic hydrocarbons. This is contra to the teachings of Tesoro et al. and Dishburger. They teach that the reaction of benzylic and allylic halides with aziridine should be conducted in excess aziridine and/or in solvents which will at least partially solvate (dissolve) the acid acceptor. They used alcohols, ethers and other such polar solvents.

One advantage of the instant process is the insolubility of the hydrogen halide/acid acceptor by-product (e.g., NaCl) in the liquid aromatic hydrocarbon medium. This by-product can be easily removed by filtration methods. Such salts are appreciably soluble in previously used solvents and tended to form two-phase systems which were difficult to separate.

Other advantages of the subject process are improved product yields and purity. Products of previous processes were generally contaminated with undesirable by-products, such as benzyl alcohol, benzyl ethers, etc. Such by-products tended to lower the product yield and are very difficult to remove from the desired aziridine product. They are not observed in the instant process.

Reaction Medium

Any aromatic hydrocarbon which is liquid at the reaction temperature is suitable for use as the reaction medium in the instant process. Examples of such compounds include benzene and alkyl-substituted benzenes such as toluene, xylene, mesitylene, ethyl benzene, etc. Such compounds are considered nonpolar and typically have a dipole moment of from 0 to about 1 as listed in the National Bureau of Standards Circular 537. Benzene, toluene and xylene are the preferred solvents, based on economics, and benzene is most preferred. Mixtures of such aromatic hydrocarbons can likewise be used.

Reactants

Aziridines which may be suitably used herein are aziridine and other non-N-substituted aziridines which have a replaceable hydrogen atom. The aziridinyl reactants may have one or more hydrocarbon radicals attached to the carbon atoms in the ring. Such radicals include alkyl, cycloalkyl, aralkyl, acyl, etc. Such compounds form a known class of compounds, as illustrated by the disclosure in "Ethylenimine and Other Aziridines" by O. C. Dermer and G. E. Ham (cited above). Examples of suitable such aziridines include aziridine, 2-methylaziridine, 2-ethylaziridine, 2-butylaziridine, 2,2-dimethylaziridine, 2,2-dibutylaziridine, 2-methyl-3-ethylaziridine, 2,3-dimethylaziridine, 2-cyclohexylaziridine, 2-benzylaziridine, 2-phenethylaziridine, 2-phenylaziridine, 2-naphthylaziridine, and the like. Aziridine, 2-(lower alkyl) and 2,2-di(lower alkyl)aziridines are the best known aziridines and are therefore the preferred reactants (by "lower alkyl" above is meant alkyl of 1–4 carbon atoms).

The benzyl halide reactants are likewise a well-known class of compounds. Suitable such compounds include benzyl halides and substituted benzyl halides (chlorides, bromides and iodides). By a "substituted" benzyl halide is meant a benzyl halide bearing a substituent(s) on the ring which is inert in the process, such as hydrocarbyl, hydrocarbyloxy, hydrocarbylthio, cyano, nitro, etc. Examples of suitable such compounds include benzyl chloride, benzyl iodide, 4-methylbenzyl bromide, 3,5-dimethylbenzyl chloride, 4-t-butylbenzyl chloride, 4-octadecylbenzyl chloride, 4-vinylbenzyl chloride, 4-propenylbenzyl bromide, 2-methoxybenzyl chloride, 3-butoxybenzyl bromide, 4-hexylthiobenzyl bromide, 3-nitrobenzyl iodide, 3,5-dinitrobenzyl chloride, 3-cyanobenzyl chloride and the like.

Acid Acceptors

The inorganic compounds previously noted as acid acceptors are likewise useful in the subject process.

Such compounds include the oxides, hydroxides, alkoxides, carbonates, bicarbonates, and phosphates of the alkali metals (particularly sodium and potassium). The oxides and hydroxides of the alkaline earth metals may also be used. Powdered sodium hydroxide or potassium hydroxide is preferred and powdered potassium hydroxide is most preferred. A mixture of acid acceptors is also suitable in the process.

Ratio of Reactants

The ratio of reactants is at least one mole of aziridinyl reactant and at least one equivalent of acid acceptor per mole of benzyl halide. An excess of aziridinyl reactant and/or acid acceptor is preferred. An excess of benzyl halide in the process tends to produce undesirable polymeric aziridine by-product(s) which lowers the product yield.

Reaction Temperature

Reaction temperatures of from about 0°C. up to about 100°C. are satisfactory but best results are obtained at temperatures of from about 65°C. to about 80°C. Reaction times of up to about 8 hours are suitable at temperatures of from 65°C to 80°C.

Order of Addition

Best results are obtained when the benzyl halide reactant is added to the stirred slurry of aziridinyl reactant, solvent medium and acid acceptor.

General Procedure

To a reaction vessel equipped with efficient stirring means, heating means, reflux condenser and dropping funnel was charged 4 moles of aziridinyl reactant, 2 moles of powdered 85% KOH and 800 ml. of dry benzene. This mixture was warmed to reflux with continued stirring and the benzyl chloride reactant added dropwise over a 15 minute to 1 hour period. The stirred reaction mixture was maintained at reflux temperature for an additional 4 hours, cooled and filtered. The solvent was stripped from the filtrate under reduced pressure to give the crude product. The final product was obtained therefrom by distillation under reduced pressure. The product structure was confirmed by infrared and nuclear magnetic resonance spectroscopy and vapor phase chromatography. The product yield in each instance was based on benzyl chloride reactant.

EXAMPLES 1–4

Several experiments were run in accordance with the above general procedure (or a scaled-down version thereof). The details are summarized in Table I.

Table I

| Ex. | Benzyl Halide | Aziridinyl Reactant | Product |
|---|---|---|---|
| 1 | Benzyl Chloride | Aziridine | N-Benzylaziridine; water-white mobile liquid boiling at 48–54°C./1.5 mm. Hg.; distilled yield 84.2%. |
| 2 | ar-Vinylbenzyl Chloride | Aziridine | N-(ar-Vinylbenzyl) aziridine; water-white mobile liquid boiling at 72–73°C./0.6 mm. Hg.; crude yield 91.1%; distilled yield 79.4%. |
| 3 | ar-Vinylbenzyl Chloride | 2,2-Dimethylaziridine | N-(ar-Vinylbenzyl)-2,2-dimethylaziridine; water-white mobile liquid boiling at 82–84°C./0.7 mm. Hg.; distilled yield 84.4%. |
| 4 | ar-Vinylbenzyl Chloride | 2-Ethylaziridine | N-(ar-Vinylbenzyl)-2-ethylaziridine; water-white mobile liquid boiling at 75–77°C./0.4 mm. Hg.; distilled yield 66%. |

In each example the product was obtained in excellent purity (e.g. 98–99% via vapor phase chromatography).

The ar-vinylbenzyl chloride used in Examples 2–4 was an isomeric mixture containing approximately 60–70% of the meta isomer and 40–30% of the para isomer and insignificant amounts of the ortho isomer. The mixture contained 0.1 weight percent of p,p'-diphenylphenylenediamine as an inhibitor.

A repetitive experiment based on Example 2 above using cyclohexane as a substitute reaction medium gave a 73.7% crude yield and a 49.1% distilled yield, demonstrating the superiority of the aromatic hydrocarbons as a reaction medium.

In analogous manner, N-(4-methoxybenzyl)aziridine is prepared by reacting 4-methoxybenzyl chloride with aziridine in the presence of powdered NaOH (or $K_2CO_3$) in toluene as the reaction medium. Similarly, N-(phenoxybenzyl)aziridine is prepared by reacting chloromethylated diphenyl oxide with aziridine in the presence of powdered KOH and in benzene as the reaction medium. In another instance, N-(3,5-dimethylbenzyl)-2-methylaziridine is prepared by reacting 3,5-dimethylbenzyl chloride with 2-methylaziridine in the presence of powdered KOH in xylene as the reaction medium.

Other N-benzylically substituted aziridines can be prepared in like manner by using the appropriate combination of benzyl halide and aziridinyl reactants.

The N-benzylically substituted aziridines and polymers thereof are known classes of compounds having a variety of uses, e.g., the N-benzylically substituted aziridines can be polymerized by contacting them with a protic acid, such as HCl. The polymers thus formed are water-insoluble low molecular weight compound (D.P. of about 2–10) having tertiary amino groups along the backbone. They are useful as cure rate accelerators in rubber compositions. Those skilled in the art will known how to use them in this utility. Typically, the polymers will be included in the rubber masterbatch in amounts of from about 0.5 to about 10 weight percent, based on the weight of the rubber.

The polymers are also useful as acid acceptors and as corrosion inhibitors in chlorinated solvents (e.g., 1,1,1-trichloroethane). They are included in small but inhibiting amounts (e.g. from about 0.25 to about 5 weight percent) in said chlorinated solvents.

What is claimed is:

1. In the process of preparing N-benzylically substituted aziridines comprising reacting by contacting (a) a benzyl chloride, bromide or iodide which may bear one or more substituents on the ring which are inert in the process, with (b) a non-N-substituted aziridine at a temperature of from about 0°C. to about 100°C. and in the presence of (c) an acid acceptor, the improvement consisting of conducting said process in a liquid aromatic hydrocarbon reaction medium.

2. The process defined by claim 1 wherein said aromatic hydrocarbon is benzene or an alkyl-substituted benzene.

3. The process defined by claim 2 wherein said aromatic hydrocarbon is benzene, toluene or xylene.

4. The process defined by claim 2 wherein said aromatic hydrocarbon is benzene.

5. The process defined by claim 1 wherein said temperature is from about 65°C. to about 80°C.

6. The process defined by claim 1 wherein (c) is an alkali metal oxide, hydroxide, alkoxide, carbonate, bicarbonate or phosphate, or an alkaline earth metal oxide or hydroxide.

7. The process defined by claim 6 wherein (c) is powdered NaOH or powdered KOH.

8. The process defined by claim 1 wherein at least one mole of (b) and at least one equivalent of (c) is present per mole of (a).

9. The process defined by claim 8 wherein (a) is benzyl chloride or ar-vinylbenzyl chloride, (b) is aziridine, 2-(lower alkyl)aziridine or 2,2-di(lower alkyl)aziridine, (c) is powdered NaOH or powdered KOH, and wherein said aromatic hydrocarbon is benzene, toluene or xylene.

10. The process defined by claim 9 wherein (b) is aziridine, 2-methylaziridine, 2-ethylaziridine or 2,2-dimethylaziridine, (c) is powdered KOH, the temperature is from about 65°C. to about 80°C. and said aromatic hydrocarbon is benzene.

* * * * *